(12) United States Patent
Ueki

(10) Patent No.: US 9,132,366 B2
(45) Date of Patent: Sep. 15, 2015

(54) FUEL FILTER

(75) Inventor: Yasushi Ueki, Yokohama (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 313 days.

(21) Appl. No.: 13/880,868

(22) PCT Filed: Oct. 20, 2011

(86) PCT No.: PCT/JP2011/074140
§ 371 (c)(1),
(2), (4) Date: May 14, 2013

(87) PCT Pub. No.: WO2012/053583
PCT Pub. Date: Apr. 26, 2012

(65) Prior Publication Data
US 2013/0284662 A1   Oct. 31, 2013

(30) Foreign Application Priority Data

Oct. 21, 2010   (JP) ................................. 2010-236581

(51) Int. Cl.
*B01D 29/13* (2006.01)
*B01D 35/027* (2006.01)
*F02M 37/22* (2006.01)
*F02M 37/10* (2006.01)

(52) U.S. Cl.
CPC ............ *B01D 29/13* (2013.01); *B01D 35/0273* (2013.01); *F02M 37/22* (2013.01); *F02M 37/106* (2013.01); *F02M 2037/228* (2013.01)

(58) Field of Classification Search
None
See application file for complete search history.

(56) References Cited

U.S. PATENT DOCUMENTS

| 5,547,568 | A | * | 8/1996 | Sasaki ......................... 210/172.4 |
| 5,607,578 | A | * | 3/1997 | Ohkouchi et al. .......... 210/172.4 |
| 5,639,367 | A | * | 6/1997 | Ohzeki et al. ................. 210/315 |
| 5,665,229 | A | * | 9/1997 | Fitzpatrick et al. ........... 210/232 |
| 6,821,422 | B1 | * | 11/2004 | Brzozowski et al. ...... 210/416.4 |

* cited by examiner

Primary Examiner — Benjamin Kurtz
(74) Attorney, Agent, or Firm — Manabu Kanesaka

(57) ABSTRACT

A fuel filter includes a filter member formed in a bag shape by a filter material sheet; and a frame member disposed inside the filter member. The frame member includes a base frame spreading out inside the filter member, and a cantilever spring formed in the base frame. The base frame includes first frames extending in a long-side direction, and second frames connected to the first frames and extending in a short-side direction perpendicular to the long-side direction. The first frames include a bent portion which is bent between portions wherein adjacent second frames are connected. A base end portion of the cantilever spring is connected to a second frame, and an end portion of the cantilever spring is disposed between adjacent second frames.

6 Claims, 4 Drawing Sheets

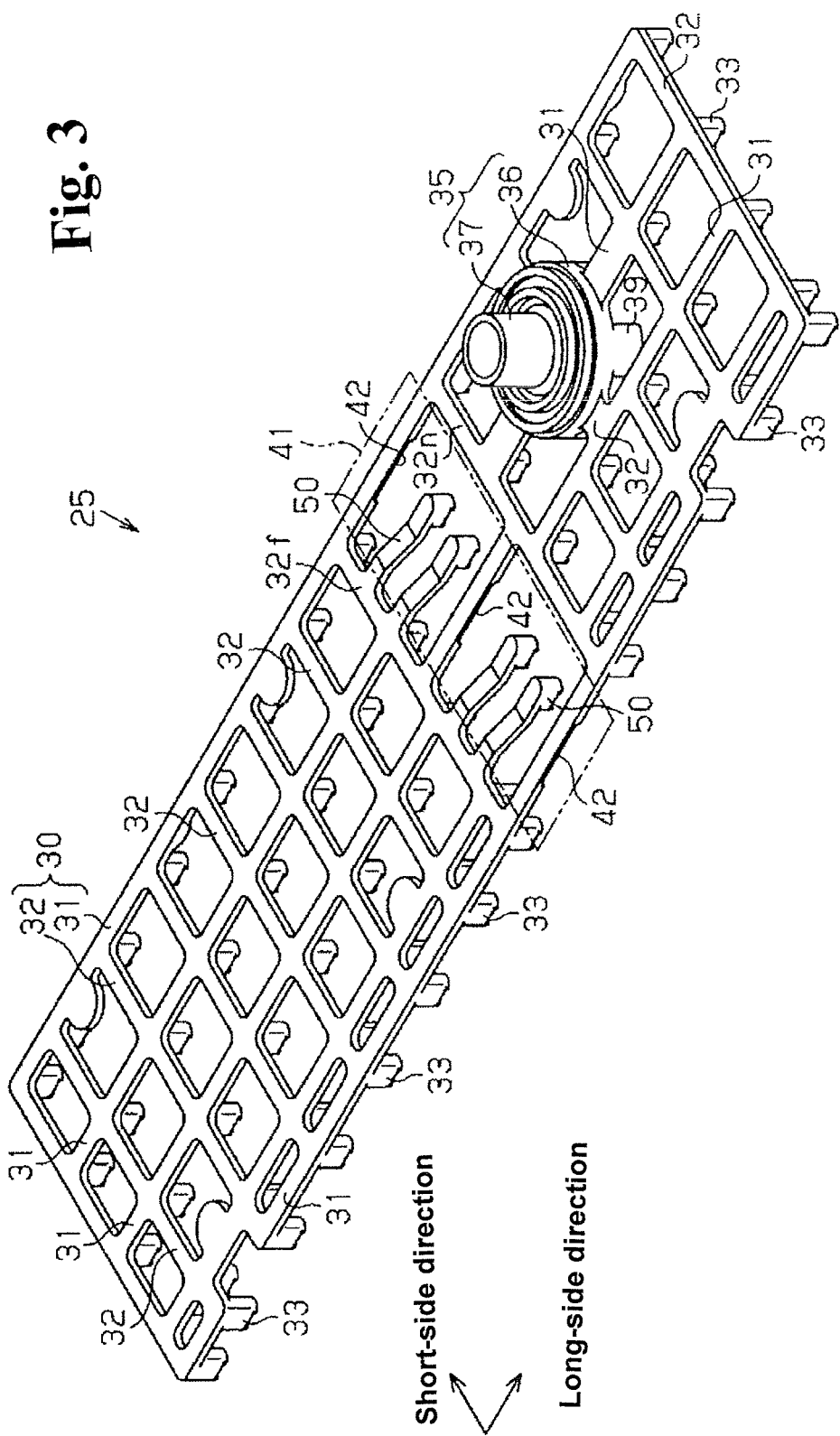

Fig. 7
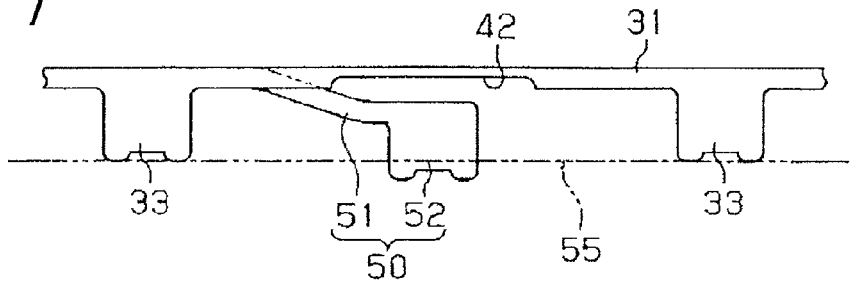
Fig. 8
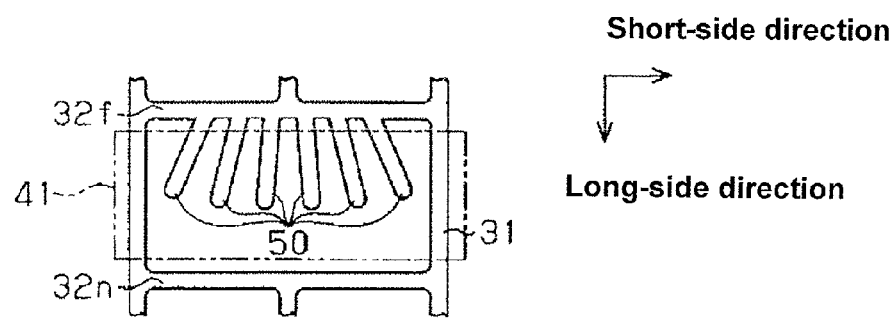
Short-side direction
Long-side direction
Fig. 9(a)
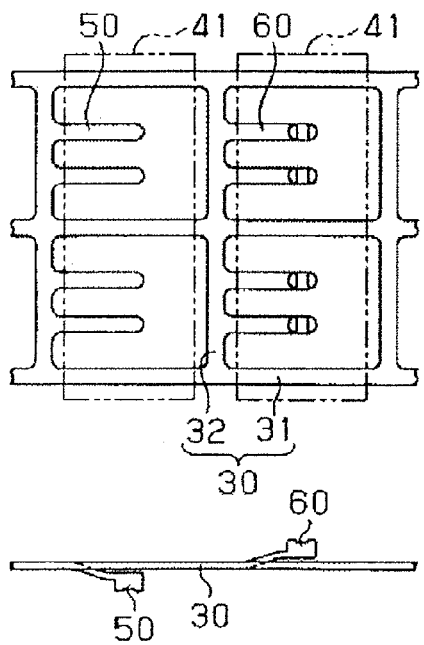
Fig. 9(b)

FUEL FILTER

FIELD OF TECHNOLOGY

The present invention relates to a fuel filter filtering a fuel inside a fuel tank.

BACKGROUND ART

The fuel inside the fuel tank in an automobile, a motorcycle, or the like is usually supplied to an internal combustion through a fuel filter disposed inside the fuel tank. As for such a fuel filter, as described in, for example, Patent Document 1, there is known a fuel filter using a bag-like filter member formed by a filter material sheet such as a mesh woven fabric, a nonwoven fabric cloth, or the like.

In the fuel filter described in the Patent Document 1, inside the filter member formed in a bag shape, there is disposed a flexible frame member as a framework allowing a pair of sheet portions to be mutually separated in the inside. Then, once the fuel filtered in the pair of respective sheet portions has been stored inside the filter member enclosed by the aforementioned sheet portions, the fuel is supplied to the internal combustion through a suction opening from the inside of the filter member.

According to the aforementioned configuration, an outer surface of the filter member is configured by a pair of sheet portions so as to provide a filtration function to approximately a whole outer surface of the filter member. Also, the frame member has a flexibility so as to be capable of bending the filter member itself. Therefore, when the filter member is attached into the fuel tank, the filter member can be bent by conforming to a size of an entrance of the fuel tank. Also, when the filter member is fixed into the fuel tank, the filter member can also be bent by conforming to a shape of the fuel tank.

PRIOR ART DOCUMENT

Patent Document

Patent Document 1: Japanese Patent Application Publication No. 2008-157112

SUMMARY OF THE INVENTION

Problems to be Solved by the Invention

The frame member described in the Patent Document 1, however, includes one longitudinal frame formed in a thin plate shape extending in a long-side direction of the sheet portions. In the longitudinal frame, there is connected a plurality of transverse frames formed in a thin plate shape extending in a short-side direction of the sheet portions. Also, in each of the plurality of transverse frames, there are formed ribs in such a way as to protrude toward internal surfaces of the pair of sheet portions. Then, the pair of respective sheet portions is pressed toward outside from an inside by the plurality of ribs, so that the pair of sheet portions is separated from each other. Also, one portion of the longitudinal frame is bent, so that the frame member itself is bent.

Thus, in the fuel filter wherein a bend of the frame member is used, if the ribs are formed in a bending portion of the frame member, the frame member is difficult to bend, so that the ribs are formed in a position avoiding the bending portion. However, in the aforementioned configuration, in the bending portion of the filter member, a filter material sheet is not pressed to the outside thereof, so that an interval of the sheet portions is significantly narrowed. As a result, in the bending portion of the filter member, the sheet portions are scraped so as to generate a noise, or a fuel becomes difficult to circulate, so that there is a risk that a filtration performance of the fuel filter declines.

The present invention is made in view of the aforementioned actual situation, and an object of the present invention is to provide a fuel filter preventing the filtration performance from declining by the bending portion of the filter member.

Means for Solving the Problems

The present invention provides a fuel filter comprising a filter member formed in a bag shape by a filter material sheet, and a frame member provided to be disposed inside the filter member. The frame member includes a base frame spreading out inside the filter member, and a resin spring having a cantilever shape formed in the base frame. The base frame includes a first frame extending in a first direction, and a plurality of second frames connected to the first frame and extending in a second direction which intersects with the first direction. The first frame includes a bent portion which is bent between portions wherein adjacent second frames are connected. The base end portion of the resin spring is connected to the second frame, and the end portion of the resin spring is disposed between the adjacent second frames.

In a preferred aspect of the present invention, the resin spring is formed in such a way as to approach the filter material sheet from the base end portion to the end portion.

According to the preferred aspect, compared to a case wherein a distance between the end portion of the resin spring and the filter material sheet, and a distance between the base end portion of the resin spring and the filter material sheet are the same, the filter material sheet in the bent portion can be easily pressed to an outside of the filter member by the end portion of the resin spring. Therefore, by a bending portion of the filter member, a filtration performance of the fuel filter can be more reliably prevented from declining.

In a preferred aspect of the present invention, the resin spring includes an end rib protruding toward the filter material sheet in the end portion.

According to the preferred aspect, since the end rib is provided in the end portion of the resin spring, an interval of the filter material sheet in the bending portion of the filter member can be ensured at least for a thickness of the end rib.

In a preferred aspect of the present invention, the first frame is formed linearly extending in the first direction, and the second frame is formed linearly extending in the second direction. At least one of the first frame and the second frame includes a frame rib protruding from a planar face including the first frame and the second frame. In the filter member, a pair of sheet portions spreading out along the aforementioned planar face is welded at mutual edges so as to be formed in the bag shape. The end rib protrudes toward the filter material sheet from the aforementioned planar face more than the frame rib.

According to the preferred aspect, the end rib formed in the resin spring protrudes toward the filter material sheet more than the frame rib formed in the base frame. Namely, the end rib formed in the resin spring becomes closer to the filter material sheet than the frame rib formed in the base frame. With such a configuration, when the base frame is bent, in the bending portion of the filter member, the interval of the filter material sheets can be easily expanded.

In a preferred aspect of the present invention, the base frame includes the plurality of first frames, and the bent portions in the plurality of respective first frames are disposed along the second direction, and the end portion of the resin spring is disposed between the adjacent bent portions in a plan view which faces the aforementioned planar face.

Within the filter member, a portion wherein the interval of the sheet portions becomes the narrowest is a portion overlapping with an area wherein the bent portions are connected in the aforementioned plan view. According to the preferred aspect, in the aforementioned plan view, the plurality of bent portions and the end portion of the resin spring are lined up along the second direction, so that when the base frame is bent, in the bending portion of the filter member, the interval of the filter material sheets can be more effectively expanded. Therefore, the filtration performance of the fuel filter can be effectively prevented from declining.

In a preferred aspect of the present invention, the bent portion is a thin-walled portion having a thickness thinner than that of the portion other than the bent portion within the first frames, and having a flexibility.

According to the preferred aspect, by a simple configuration of reducing the thickness of one portion in the first frames, the frame member can be bent.

Effect of the Invention

According to the present invention, the base end portion of the resin spring of the frame member is connected to the second frame, and the end portion of the resin spring is disposed between the second frame and the adjacent second frame. Therefore, since the base end portion of the resin spring is formed in a position differing from the bent portion, the resin spring does not have any influence on the rigidity in the bent portion of the frame member. Then, since the end portion of the resin spring is disposed between the second frames, in a case wherein the frame member is bent at the bent portion, the end portion of the resin spring presses the filter material sheet in the bent portion to the outside from an inside of the filter member. As a result, the bending portion of the frame member can prevent both the sheet portions from being scrapped so as to generate a foreign material, or prevent a fuel from becoming difficult to flow. Therefore, the bending portion of the filter member can prevent the filtration performance of the fuel filter from declining.

BRIEF DESCRIPTION OF THE DRAWINGS

FIG. 3 is a perspective view showing a perspective structure of a frame member.

FIG. 7 is a side view showing a lateral structure of the frame member near the cantilever spring.

FIG. 8 is a plan view showing the cantilever spring in a modified example.

FIG. 9(a) is a plan view and FIG. 9(b) is a side view, of the frame member in the modified example.

BEST MODES OF CARRYING OUT THE INVENTION

Figure 1:
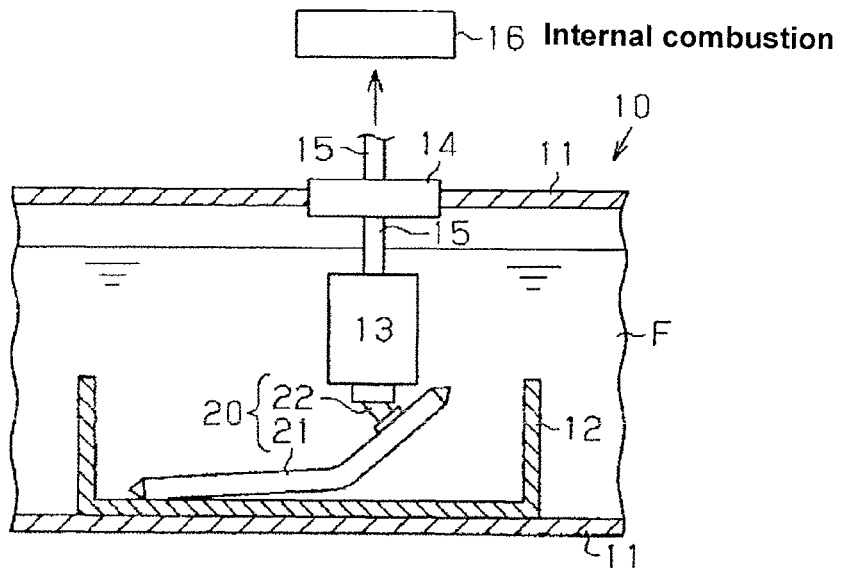
FIG. 1 shows a pattern diagram of a schematic configuration of a fuel supply device using a fuel filter according to one embodiment of the present invention.

Hereinafter, with reference to FIG. 1 to FIG. 7, embodiments of a fuel filter according to the present invention will be explained. First, a fuel supply device wherein the fuel filter is used will be explained. FIG. 1 is a pattern diagram of a schematic configuration of the fuel supply device.

As shown in FIG. 1, a fuel supply device 10 comprises a fuel tank 11 wherein a fuel F is stored; a chamber 12 and a fuel pump 13 disposed inside the fuel tank 11; and a fuel filter 20 provided to be disposed inside the chamber 12. The fuel filter includes a filter body 21 configured to be bendable and filtering the fuel F; and a connecting member 22 connected to the filter body 21. The filter body 21 is bent such that one end thereof presses a bottom wall of the chamber 12, and is connected to the fuel pump 13 through the connecting member 22. The fuel pump 13 is connected to a supply plumbing 15 fixed to the fuel tank 11 by a flange 14. Then, in the fuel supply device 10, the fuel pump 13 is driven, so that the fuel F inside the chamber 12 is filtered by the fuel filter 20, and the filtered fuel F is supplied to an internal combustion 16 through the supply plumbing 15.

Figure 2A:
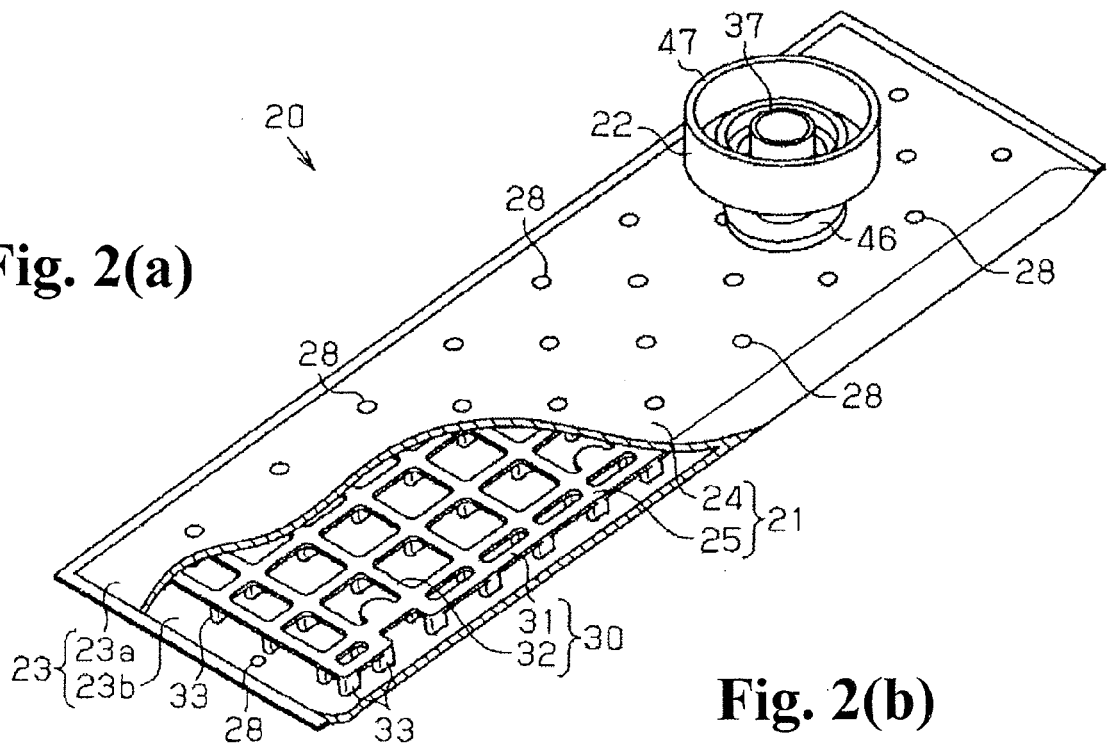
FIG. 2(a) is a perspective view showing a perspective structure of the fuel filter, and is a drawing partially showing an inner structure of a fuel filter member.
Figure 2B:
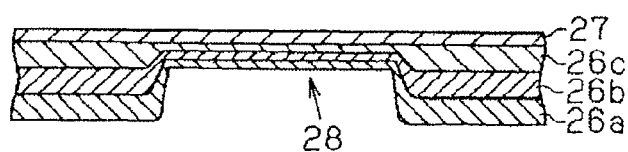
FIG. 2(b) is a cross-sectional view showing a cross-sectional structure of a filter material sheet in a welding portion.
Figure 4:
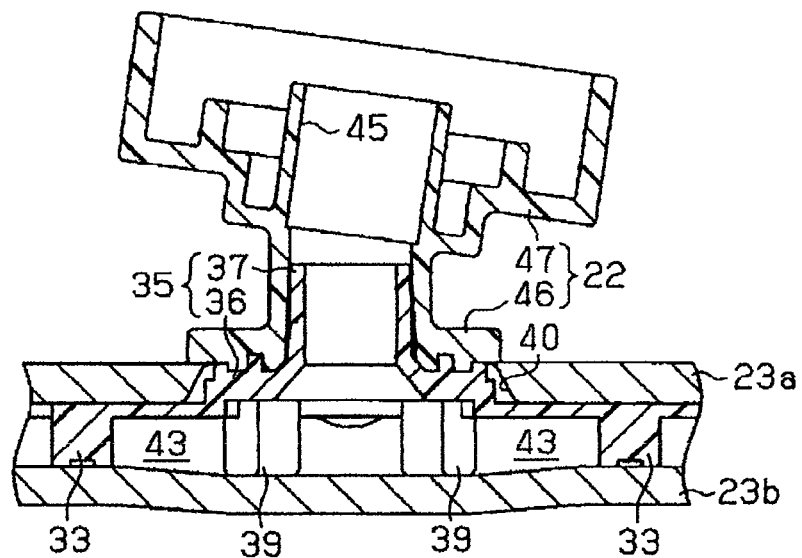
FIG. 4 is a cross-sectional view of a cross-sectional structure of the fuel filter near a connecting portion.

Next, with reference to FIG. 2(a) to FIG. 6, the aforementioned fuel filter 20 will be explained in detail. FIG. 2(a) is a perspective view showing a perspective structure of the fuel filter, and in order to explain an inner structure of the fuel filter, FIG. 2(a) shows a state wherein one portion of the fuel filter is notched. FIG. 2(b) is a cross-sectional view showing a cross-sectional structure of a filter material in a welding portion. FIG. 3 is a perspective view showing a perspective structure of a frame member. FIG. 4 is a cross-sectional view showing a cross-sectional structure of the fuel filter near a connecting portion.

As shown in FIG. 2(a), the fuel filter 20 includes the filter body 21 extending in one direction, and the connecting member 22 connected to one end in a long-side direction of the filter body 21. The filter body 21 is configured by a filter member 24 formed in a flat bag shape by mutually opposed upper-side sheet portion 23a and a lower-side sheet portion 23b; and a frame member 25 provided to be disposed inside the filter member 24.

The filter member 24 is formed from one sheet of filter material sheet 23 wherein a plurality of sheet-like synthetic fibers is laminated. The filter member 24 includes the filter material sheet 23 doubly folded at one fold line, and the upper-side sheet portion 23a and the lower-side sheet portion 23b, which are partitioned by the fold line, are welded at mutual edges so as to be formed in the bag shape. As shown in FIG. 2(b), the filter material sheet 23 of the present embodiment includes a nonwoven fabric cloth 26a formed by polypropylene fibers as the innermost layer, and a plain-woven mesh woven fabric 27 which can separate oil and water as the outermost layer. Between the nonwoven fabric cloth 26a and the mesh woven fabric 27, there are laminated nonwoven fabric cloths 26b and 26c in such a way that a size of a mesh diminishes as the nonwoven fabric cloth is positioned on the inner side.

In the filter member 24 configured by such a filter material sheet 23, a foreign matter having a large particle diameter is trapped at the layer positioned on the outer side, and a foreign matter having a small particle diameter is trapped at the layer positioned on the inner side. Namely, the foreign matters having a different size are trapped at the mutually different layers so as to be capable of preventing from clogging in each layer. Incidentally, if a nonwoven fabric cloth formed by a spunbonded method is employed on the nonwoven fabric cloth 26b which is the innermost layer, and if a nonwoven fabric cloth formed by a meltblown method is employed on the nonwoven fabric cloths 26b and 26c which are inner layers, a relatively-high rigidity is provided to the nonwoven fabric cloth 26a so as to be capable of preventing from generating a particle from the nonwoven fabric cloth due to a scrape between the nonwoven fabric cloth 26a and the frame member 25.

In the filter material sheet 23, there is discretely provided a plurality of welding portions 28 wherein the nonwoven fabric cloths 26a, 26b, and 26c, and the mesh woven fabric 27 are welded by a ultrasonic welding method from a nonwoven fabric cloth 26a side which becomes the innermost layer. The plurality of respective welding portions 28 is formed in a circular hole shape on an inner face of the filter member 24. Such welding portions 28 are formed, so that the laminated nonwoven fabric cloths 26a, 26b, and 26c, and the mesh woven fabric 27 are mutually fixed. Consequently, at a usage time of the fuel filter 20, the nonwoven fabric cloths 26a, 26b, and 26c, and the mesh woven fabric 27 can be prevented from being mutually misaligned. Also, the filter material sheet 23 can be cut out of a base material wherein the nonwoven fabric cloths 26a, 26b, and 26c, and the mesh woven fabric 27 are laminated. Moreover, in a laminated state of those, the fuel filter 20 can be assembled.

The frame member 25 provided to be disposed inside the filter member 24 is formed by synthetic resin having a flexibility. As shown in FIG. 3, the frame member 25 includes a base frame 30 in a grid-like pattern configured by a plurality of first frames 31 extending linearly in a long-side direction which is a first direction; and a plurality of second frames 32 extending linearly in a short-side direction which is a second direction perpendicular to the long-side direction. In the base frame 30, there are provided frame ribs 33 protruding toward the lower-side sheet portion 23b in portions wherein the first frames 31 and the second frames 32 intersect. In the frame ribs 33, ends thereof abut against the inner face of the filter member 24, and press the inner face of the filter member 24 to an outside of the filter member 24 so as to hold an interval between the base frame 30 and the lower-side sheet portion 23b. Incidentally, the frame ribs 33 are formed to be larger than the welding portions 28 in a plan view facing an outer surface of the filter member 24, i.e., in a plan view facing the lower-side sheet portion 23b.

Also, the base frame 30 includes a connecting portion 35 wherein the connecting member 22 is connected. The connecting portion 35 includes an approximately cylindrical flange portion 36 supported by the first frames 31 and the second frames 32; and an approximately cylindrical suction portion 37 extending in a direction opposite to the frame ribs 33 from the flange portion 36. Also, in the connecting portion 35, there are equally disposed four suction ribs 39 protruding to a lower-side sheet portion 23b side from the flange portion 36 in a circumferential direction of the flange portion 36. The suction ribs 39 abut against the inner face of the filter member 24, and hold an interval between the flange portion 36 of the connecting portion 35 and the lower-side sheet portion 23b so as to prevent the suction portion 37 from being blocked by the lower-side sheet portion 23b. As shown in FIG. 4, one portion of the flange portion 36 in the connecting portion 35 is exposed to the outside of the filter member 24 through a through hole 40 provided in the upper-side sheet portion 23a.

Also, the suction portion 37 in the connecting portion 35 protrudes to the outside of the filter member 24 through the same through hole 40.

The base frame 30 includes a bent portion 41 on a connecting portion 35 side rather than the center in the long-side direction through the entire width in the short-side direction of the base frame 30. The bent portion 41 is a portion wherein intervals of adjacent first frames 31 are larger, and also an interval of adjacent second frames 32n and 32f is larger, than intervals of portions other than the bent portion 41 in the base frame 30. In each first frame 31 configuring the bent portion 41, as a bent part, there are provided thin-walled portions 42 having a thin thickness to line up in the short-side direction. Namely, the bent portion 41 is configured to have a rigidity lower than that of the other portions. When an external force acts on the frame member 25, the bent portion 41 is the portion preferentially bent more than the portions other than the bent portion 41. By providing such a bent portion 41, compared to a frame member with a configuration wherein the bent portion 41 is not provided, a mechanical load on the frame member 25 based on the external force can be reduced.

According to the filter body 21 configured in the aforementioned manner, the upper-side sheet portion 23a is pressed to the outside of the filter body 21 by the base frame itself. Also, the lower-side sheet portion 23b is also pressed to the outside of the filter body 21 by the frame ribs 33 and the suction ribs 39. Therefore, an interval between the upper-side sheet portion 23a and the lower-side sheet portion 23b is held so as to form a storage space 43 having a predetermined size between the upper-side sheet portion 23a and the lower-side sheet portion 23b. Then, the fuel F, filtered by approximately the whole upper-side sheet portion 23a and approximately the whole lower-side sheet portion 23b, flows into the suction portion 37 through such a storage space 43.

As shown in FIG. 4, a lower end portion 46 of the connecting member 22 is connected to the connecting portion 35 of the frame member 25, and an upper end portion 47 of the connecting member 22 is connected to the fuel pump 13 (see FIG. 1). In the connecting member 22, there is formed a communication passage 45 to pass through from the lower end portion 46 to the upper end portion 47, and in the communication passage 45, there is inserted the suction portion 37 of the connecting portion 35 on a lower end portion 46 side thereof. Also, the lower end portion 46 of the connecting member 22 is connected to the flange portion 36 in a state wherein the upper-side sheet portion 23a is clamped by the flange portion 36 of the connecting portion 35 and the lower end portion 46. Then, when the fuel pump 13 operates, the fuel F flowed into the suction portion 37 is introduced to the fuel pump 13 through the communication passage 45 of the connecting member 22.

Thus, in the fuel filter 20 wherein a bend of the frame member 25 is used, if the frame ribs 33 are formed in the bent portion 41 of the frame member 25, the bent portion 41 becomes difficult to be bent, so that the frame ribs 33 are formed in the positions avoiding the bent portion 41. However, in the frame member 25 having the aforementioned configuration, the sheet portion 23b is not pressed to the outside in a bending portion of the filter member 24, and the interval of the sheet portions 23a and 23b is significantly narrowed. As a result, in the bending portion of the filter member 24, the sheet portions 23a and 23b are scraped so as to generate a foreign matter, or the fuel F becomes difficult to circulate, so that a filtration function becomes difficult to be expressed at the filter member 24 in an area far from the suction portion 37 rather than the bending portion. Namely, there is a risk of declining a filtration performance of the fuel filter 20. Therefore, in the frame member 25 of the present embodiment, as shown in FIG. 3, among the adjacent second frames 32n and 32f in a form of sandwiching the bent portion 41, there is provided a plurality of cantilever springs 50 wherein base end portions are connected to the second frame 32f which is positioned far relative to the connecting portion 35.

Figure 5:
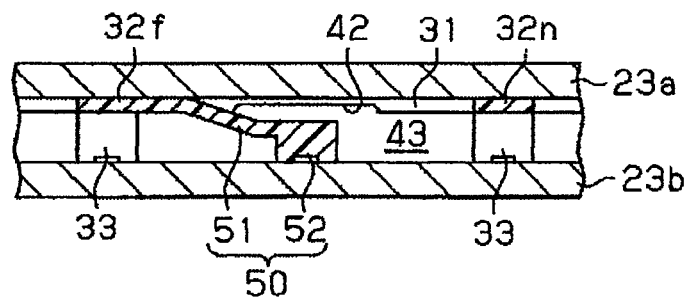
FIG. 5 is a cross-sectional view showing a cross-sectional structure of a filter body near a cantilever spring.
Figure 6:
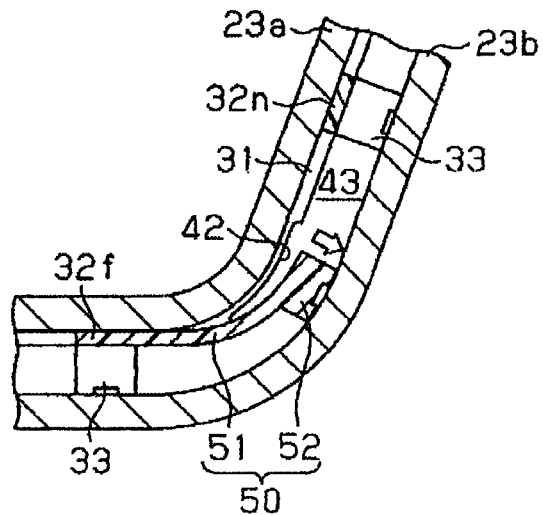
FIG. 6 is a cross-sectional view showing a cross-sectional structure of the filter body in a bent portion.

The cantilever springs 50 will be explained in detail with reference to FIGS. 3, and 5 to 7. FIG. 5 is a cross-sectional view showing a cross-sectional structure of the filter body near the cantilever spring. FIG. 6 is a cross-sectional view showing a cross-sectional structure of the filter body in a bent portion, and shows the cross-sectional structure near the cantilever spring 50. FIG. 7 is a side view showing a lateral structure of the frame member near the cantilever spring.

As shown in FIG. 3, each cantilever spring 50 extends along the long-side direction toward the second frame 32n from the aforementioned base end portion. An end portion of each cantilever spring 50 is disposed in a position which is in an area overlapping with the bent portion 41, and is sandwiched by the thin-walled portions 42 lined up in the short-side direction in a plan view facing a planar face including the first frames and the second frames 32. Also, as shown in FIG. 5, the cantilever spring 50 of the present embodiment is configured by a spring main body 51 formed to extend and protrude in such a way as to approach the lower-side sheet portion 23b from the base end portion provided in the second frame 12f to the end portion sandwiched by the thin-walled portions 42; and an end rib 52 formed in the end portion of the spring main body 51, and protruding toward the lower-side sheet portion 23b.

As shown in FIG. 6, in the cantilever spring 50 having the aforementioned configuration, in a case wherein the frame member 25 is bent at the bent portion 41, the interval of the sheet portions 23a and 23b is narrowed. With that, the spring main body 51 bends to an upper-side sheet portion 23a side. Then, by a force based on bending thereof, the cantilever spring 50 can push back the lower-side sheet portion 23b in such a way as to be separated from the upper-side sheet portion 23a, i.e., to the outside of the filter member 24. Also, in the end portion of the cantilever spring 50, there is formed the end rib 52. According to the aforementioned configuration, the interval of the sheet portions 23a and 23b in the bending portion of the filter member 24 can be ensured at least for a portion according to a thickness of the end portion of the cantilever spring 50, i.e., the end rib 52. As a result, in the bending portion of the filter member 24, the interval of the sheet portions 23a and 23b is not significantly narrowed so as to be capable of preventing the sheet portions 23a and 23b from being scraped, and preventing the fuel from being difficult to circulate. Therefore, the bending portion of the filter member 24 can prevent the filtration performance of the fuel filter 20 from declining.

Also, in the cantilever spring 50, the base end portion thereof is provided in the second frame 32f which is a portion differing from the bent portion 41. Consequently, the cantilever spring 50 does not have any influence on the rigidity in the bent portion 41 of the frame member 25. Namely, the aforementioned cantilever spring 50 can prevent the interval of the sheet portions 23a and 23b from significantly narrowing in the bending portion of the filter member 24 without making the frame member 25 difficult to bend.

Also, within the bending portion of the filter member 24, a portion wherein the interval of the sheet portions 23a and 23b becomes the narrowest is a portion overlapping with an area wherein the plurality of aforementioned thin-walled portions 42 is connected in the plan view facing the planar face including the first frames 31 and the second frames 32. On the other hand, in the cantilever spring 50 having the aforementioned configuration, the end portion is disposed in the position sandwiched by the thin-walled portions 42 in the aforementioned plan view. Namely, the end rib 52 is disposed in the position wherein the interval of the sheet portions 23a and 23b becomes the narrowest within the bent portion of the filter member 24. With the aforementioned configuration, at the bending portion of the filter member 24, the interval of the sheet portions 23a and 23b can be effectively prevented from narrowing.

Next, an operation of the cantilever spring 50 having the aforementioned configuration will be explained in more detail. In the present embodiment, the base end portion of the cantilever spring 50 is connected to the second frame 32f which is positioned far relative to the connecting portion 35 among the second frames 32n and 32f sandwiching the bent portion 41. In the cantilever spring 50, the spring main body 51 bends according to a bend state of the frame member 25, and the cantilever spring 50 pushes back the lower-side sheet portion 23b. While the force based on the bending of the spring main body 51 becomes a force pushing back the lower-side sheet portion 23b, the force based on the bending of the spring main body 51 also can be a restoring force attempting to restore the base frame 30 to an original flat shape. There, in a case wherein the base end portion of the cantilever spring 50 is connected to the second frame 32n which is in a position close to the connecting portion 35, the aforementioned restoring force attempts to restore the base frame 30 to the original shape based on the base frame 30 which is in an area far from the bent portion 41 relative to the suction portion 37. On the other hand, as in the case of the present embodiment, in a case wherein the base end portion of the cantilever spring 50 is connected to the second frame 32f which is in a position far from the connecting portion 35, the aforementioned restoring force attempts to restore the base frame 30 to the original shape based on the base frame 30 which is in an area closer than the bent portion 41 relative to the suction portion 37. Namely, the base end portion of the cantilever spring 50 is connected to the second frame 32f, which is in the position far from the connecting portion 35, so as to be capable of pressing the bottom wall of the chamber 12 by a larger force. Thereby, the bottom wall of the chamber 12 and one end of the filter body 21 can reliably be contacted.

Also, in the present embodiment, the spring main body 51 of the cantilever spring 50 is formed to extend and protrude in such a way as to approach the lower-side sheet portion 23b from the base end portion connected to the second frame 32f to the end portion sandwiched by the thin-walled portions 42. By configuring the cantilever spring 50 by such a spring main body 51, compared to a case wherein a distance between the lower-side sheet portion 23b is constant from the base end portion to the end portion, a rigidity relative to the bending into the upper-side sheet portion 23a side can be enhanced. Namely, the cantilever spring 50 becomes difficult to bend, and when the cantilever spring 50 bends, the force based on the bending thereof increases so as to be capable of easily expanding the interval of the sheet portions 23a and 23b in the bending portion of the filter member 24. Therefore, the filtration performance of the fuel filter 20 can be more reliably prevented from declining.

Also, in the present embodiment, in the cantilever spring 50, there includes the end rib 52, protruding toward the lower-side sheet portion 23b, in the end portion of the spring main body 51. Then, as shown in FIG. 7, the end rib 52 is formed in such a way that an end abutting against the lower-side sheet portion 23b protrudes to the lower-side sheet portion 23b side from a virtual face 55 connecting the ends of the frame ribs 33 provided in the base frame 30. According to the aforementioned configuration, compared to a case wherein the ends of the frame ribs 33 of the base frame 30, and the end of the end rib 52 of the cantilever spring 50 are positioned on the same surface, in a case wherein the interval of the sheet portions 23a and 23b is the same, a bending amount of the spring main body 51 increases. Namely, the lower-side sheet portion 23b of the filter member 24 can be pushed back by a larger force so as to be capable of easily expanding the interval of the sheet portions 23a and 23b in the bending portion of the filter member 24.

As explained above, according to the fuel filter 20 with respect to the present embodiment, effects as listed hereinafter can be obtained.

(1) In the frame member 25 of the aforementioned embodiment, there are provided the cantilever springs 50 including the base end portions in the second frame 32f which is the portion differing from the bent portion 41, and including the end portions between the second frame 32f and the second frame 32n. According to the aforementioned configuration, without having any influence on the rigidity of the bent portion 41 of the frame member 25, the interval of the sheet portions 23a and 23b can be prevented from narrowing in the bending portion of the filter member 24. Therefore, the filtration performance of the fuel filter 20 can be prevented from declining.

(2) The cantilever spring 50 of the aforementioned embodiment includes the spring main body 51 formed to extend and protrude in such a way as to approach the lower-side sheet portion 23b from the base end portion to the end portion. According to the aforementioned configuration, the cantilever spring 50 becomes difficult to bend, and when the cantilever spring 50 bends, the force based on the bending thereof increases so as to be capable of easily expanding the interval of the sheet portions 23a and 23b in the bending portion of the filter member 24. Therefore, the filtration performance of the fuel filter 20 can be more reliably prevented from declining.

(3) According to the aforementioned embodiment, in the end portion of the cantilever spring 50, there is provided the end rib 52 protruding toward the lower-side sheet portion 23b. According to the aforementioned configuration, the interval of the sheet portions 23a and 23b in the bent portion of the filter member 24 can be ensured at least for the portion according to the thickness of the end rib 52.

(4) The end rib 52 of the aforementioned embodiment is formed in such a way that the end abutting against the lower-side sheet portion 23b protrudes to the lower-side sheet portion 23b side more than the ends of the frame ribs 33 provided in the frame member 25. According to the aforementioned configuration, the lower-side sheet portion 23b can be pushed back by the larger force so as to be capable of easily expanding the interval of the sheet portions 23a and 23b in the bending portion of the filter member 24.

(5) According to the aforementioned embodiment, the end portion of the cantilever spring 50 is disposed in the position sandwiched by the thin-walled portions 42 in the plan view opposed to the planar face including the first frames 31 and the second frames 32. According to the aforementioned configuration, the end rib 52 is disposed in the position wherein the interval of the sheet portions 23a and 23b is the narrowest within the bent portion of the filter member 24 so as to be capable of effectively preventing the interval of the sheet portions 23a and 23b from narrowing. Therefore, the filtration performance of the fuel filter can be effectively prevented from declining.

(6) The bent portion of the aforementioned embodiment is the thin-walled portions 42. According to the aforementioned configuration, by a simple configuration wherein a thickness of one portion in the first frames 31 is reduced, the frame member 25 can be bent.

(7) According to the aforementioned embodiment, the base end portion of the cantilever spring 50 is provided in the second frame 32f which is positioned far relative to the connecting portion 35 among the second frames 32n and 32f sandwiching the bent portion 41. According to the aforementioned configuration, in the filter body 21 which is bent so as to press the bottom wall of the chamber 12 by one end, the bottom wall of the chamber 12 can be pressed by the larger force, and the bottom wall of the chamber 12 and one end of the filter body 21 can reliably be contacted.

Incidentally, the aforementioned embodiment can also be implemented with the following aspects.

In the aforementioned embodiment, the bent portion is configured by the thin-walled portions 42. The bent portion is not limited to the above provided that the bent portion is configured so as to have the rigidity lower than the other portions. For example, in the embodiment, since the frame member 25 has the flexibility, the thin-walled portions 42 may be omitted. Even in such a configuration, the same effects as described in above (1) to (5) can be obtained.

In the embodiment, the end portion of the cantilever spring 50 is disposed in the position sandwiched by the adjacent thin-walled portions 42 in the plan view facing the planar face including the first frames 31 and the second frames 32. The configuration is not limited to the above provided that the end portion of the cantilever spring 50 is disposed between the second frames 32f and 32n in the aforementioned plan view. Even in such a configuration, the same effects as described in above (1) to (4) can be obtained.

The frame member 25 of the embodiment is configured such that the end of the end rib 52 of the cantilever spring 50 is positioned on the lower-side sheet portion 23b side rather than the virtual face 55 connecting the ends of the frame ribs 33 of the frame member 25. The configuration is not limited to the above, and the end rib 52 may be formed to be on the same plane as the aforementioned virtual face 55, or the end rib 52 may be formed to be positioned on the upper-side sheet portion 23a side rather than the virtual face 55. Even in such a configuration, the same effects as described in above (1) to (3) can be obtained.

In the embodiment, although the end rib 52 is formed in the end portion of the cantilever spring 50, the end rib 52 may be omitted. Even in such a configuration, when the frame member 25 is bent, the end portion of the spring main body 51 pushes back the lower-side sheet portion 23b so as to be capable of obtaining effects similar to above (1) and (2).

The cantilever spring 50 of the embodiment includes the spring main body 51 formed to extend and protrude in such a way as to approach the lower-side sheet portion 23b from the base end portion to the end portion. The configuration is not limited to the above, and the cantilever spring may include, for example, the spring main body extending in a face direction of the planar face including the first frames 31 and the second frames 32. Even in such a configuration, the same effect as described in above (1) can be obtained.

In the embodiment, each cantilever spring 50 is formed to extend and protrude along the long-side direction from the second frame 32f. The configuration is not limited to the above, and as shown in FIG. 8, the cantilever spring 50 may be formed to extend and protrude in a direction intersecting with the long-side direction.

The cantilever spring 50 of the embodiment is configured to push back the lower-side sheet portion 23b. The configuration is not limited to the above, and as shown in FIGS. 9(a) and 9(b), the cantilever spring may be a cantilever spring 60 which pushes back the upper-side sheet portion 23a.

Also, in the embodiment, the frame member 25, wherein one bent portion 41 is provided in the base frame 30, has been embodied. However, the frame member, wherein the plurality of bent portion 41 is provided in the base frame 30, may be embodied. In such a case, as shown in FIGS. 9(a) and 9(b), the cantilever spring 50 and the cantilever spring 60 may be used for each bent portion 41. Such a configuration can enhance flexibility of a bending aspect of the frame member 25 while obtaining the effect as described in above (1).

Also, the cantilever spring 50 and the cantilever spring 60 may be used for one bent portion. Such a configuration can effectively expand the interval of the sheet portions 23a and 23b in the bending portion of the filter member 24 since the sheet portions 23a and 23b are pushed back in such a way as to be mutually separated.

The cantilever spring 50 of the embodiment includes the base end portion in the second frame 32f which is positioned far relative to the connecting portion 35 among two second frames 32n and 32f sandwiching the bent portion 41. The configuration is not limited to the above. In the cantilever spring, if the end portion is included between the adjacent second frames 32n and 32f of the second frames 32, the base end portion may be provided in the second frame 32n which is positioned close to the connecting portion 35, or the base end portion may be provided in the first frame 31.

In the embodiment, the first frames 31, extending in the long-side direction which is the first direction, is formed in the linear fashion. The configuration is not limited to the above, and the first frames 31 may be formed in a wavelike fashion provided that the first frames 31 extend in the first direction. Also, the second frames 32 may be formed not only in the linear fashion but also in the wavelike fashion as well provided that the second frames 32 are formed in a direction intersecting with the first direction.

The frame member 25 of the embodiment comprises four cantilever springs 50 relative to the bent portion 41. However, the number of the cantilever springs 50 may be appropriately changed depending on a moment-to-moment basis.

Incidentally, all contents of the specification, claims, drawings, and abstract of Japanese Patent Application No. 2010-236581 filed on Oct. 21, 2010 are cited in their entireties herein, and are incorporated as a disclosure of the specification of the present invention.

What is claimed is:

1. A fuel filter, comprising:
    a filter member formed in a bag shape by a filter material sheet; and
    a frame member disposed inside the filter member,
    wherein the frame member includes a base frame spreading out inside the filter member, and a resin spring having a cantilever shape formed in the base frame,
    the base frame includes a first frame extending in a first direction, and a plurality of second frames connected to the first frame and extending in a second direction intersecting with the first direction,
    the first frame includes a bent portion which is bent between portions wherein adjacent second frames are connected,
    a base end portion of the resin spring is connected to the second frame, and
    an end portion of the resin spring is disposed between the adjacent second frames.

2. A fuel filter according to claim 1, wherein the resin spring is formed to approach the filter material sheet from the base end portion to the end portion.

3. A fuel filter according to claim 1, wherein the resin spring includes an end rib protruding toward the filter material sheet in the end portion.

4. A fuel filter according to claim 3, wherein the first frame is formed to extend linearly in the first direction,
    the second frame is formed to extend linearly in the second direction,
    at least one of the first frame and the second frame includes a frame rib protruding from a planar face including the first frame and the second frame,
    the filter member is formed in the bag shape such that a pair of sheet portions which spreads out along the planar face is welded at edges thereof, and
    the end rib protrudes toward the filter material sheet from the planar face other than the frame rib.

5. A fuel filter according to claim 4, wherein the base frame includes a plurality of the first frames,
    the bent portion in each of the plurality of first frames is disposed along the second direction, and
    the end portion of the resin spring is disposed between the adjacent bent portions in a plan view facing the planar face.

6. A fuel filter according to claim 1, wherein the bent portion is a thin-walled portion having a thickness thinner than that of a portion other than the bent portion in the first frame, and having a flexibility.

* * * * *